Figure 1:
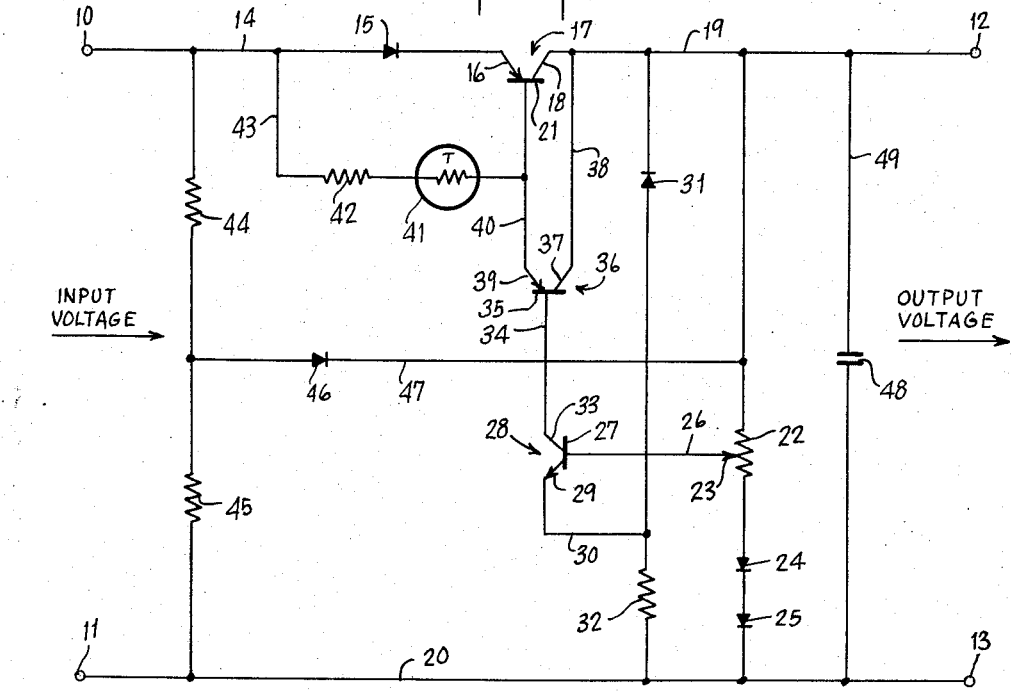

March 20, 1962     I. M. WILBUR ETAL     3,026,469
VOLTAGE REGULATOR AND OVERLOAD PROTECTION SYSTEM
Filed Nov. 13, 1959

INVENTORS
IRVIN M. WILBUR
NOEL E. BROWN
BY Darby & Darby
ATTORNEYS

United States Patent Office 3,026,469
Patented Mar. 20, 1962

3,026,469
VOLTAGE REGULATOR AND OVERLOAD PROTECTION SYSTEM
Irvin M. Wilbur and Noel E. Brown, Cincinnati, Ohio, assignors to Avco Corporation, Cincinnati, Ohio, a corporation of Delaware
Filed Nov. 13, 1959, Ser. No. 852,854
1 Claim. (Cl. 323—22)

This invention relates to regulating systems and more particularly to an improved voltage regulating system capable of providing overload protection and automatic starting.

Present day technology often requires the employment of voltage regulating systems in environments which impose severe limitations on the physical size and weight of the regulating equipment. Furthermore, the regulating equipment must be of rugged construction and must be able to operate satisfactorily over a wide range of ambient temperature variations. One of the major problems inherent in the design of voltage regulating equipment for minimal size and weight arises from the fact that an insertion and/or transformation loss occurs in the regulating equipment during operation. For example, in many of the known types of voltage regulating systems, a vacuum tube is employed as a variable resistance in series circuit with the load, to control the voltage drop across the load. Since the current drawn by the load must pass through the regulating tube, power is dissipated in the tube itself and manifests itself as heat, which then raises the operating temperature of the regulating equipment. Therefore, when the physical size of the regulating equipment is made as small as possible, the heat dissipation in the equipment may raise the operating temperature of the equipment to an unsuitably high level which may ultimately impair or even destroy the equipment itself. It is believed apparent therefore, that when the regulating system is required to handle large amounts of power, the heat dissipation problem may become the limiting factor in equipment design.

It may also be noted that many applications require the regulating system to satisfy a very wide range of load power requirements. For example, in power supplies for two-way communications equipment, the regulator need only supply a small amount of power when the communications equipment is operating as a receiver unit, while substantially greater power is required when the equipment is switched to act as a transmitter unit. Accordingly, the regulator must respond instantly to the changes in power requirement. Furthermore, it is desirable that the regulating equipment provide overload protection and include provisions for the automatic restarting of the regulator upon the cessation of the overload. For example, during the servicing of communications equipment, temporary short circuits may occur which might damage the equipment itself or even the regulator. Therefore, it is important that some means be provided to protect both the regulator and the load equipment without causing a complete shutdown of the regulator itself.

Accordingly, it is an object of this invention to provide a voltage regulating system capable of meeting severe size and weight limitations, and yet capable of supplying large amounts of power.

It is a further object of this invention to provide a voltage regulating system which is of rugged construction and which may be stabilized for operation over a wide range of ambient temperature variations.

It is a still further object of this invention to provide a voltage regulating system which exhibits a high operating efficiency over a wide range of load power demands.

It is an additional object of this invention to provide a voltage regulating system which offers substantial overload protection and which is capable of self-starting operation.

Briefly, the regulating system of the invention operates in the manner of an automatic power transformer to provide a constant output voltage over a wide range of load power demands. In a preferred embodiment of the invention, the regulator utilizes the current amplifying properties of transistors, by providing a series power transistor between an unregulated D.-C. power source and a load circuit. The conductivity of the power transistor is controlled by transistor amplifier means, which are in turn responsive to variations in the output voltage of the regulator. Since the transistors employed in the regulator of the invention operate in the manner of current and power amplifying devices, rather than merely as variable impedances, such as in many of the known regulator systems, the heat dissipation caused by the insertion and/or transformation loss is materially reduced, with the result that smaller packaging of the regulating system is possible. Furthermore, semiconductor diode devices are utilized in novel overload protection circuits to protect not only the load circuit equipment, but also the regulator itself and the D.-C. power supply source. Additionally, the voltage regulating system of the invention is capable of automatically restarting itself after an overload condition ceases, so that valuable time need not be lost in manually restarting the equipment should a short circuit occur during servicing operations of the load equipment, for example. Finally, a novel thermistor and current-sensitive diode circuit is provided to insure the stability of the regulating system with respect to both large changes in ambient temperature and wide changes in load demand current.

Figure 2:
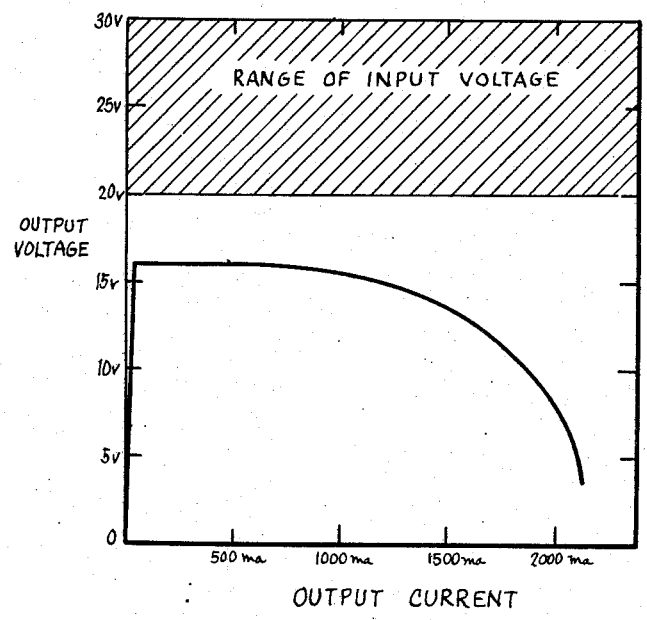

In the drawing:

FIG. 1 is a schematic circuit diagram of a voltage regulating system constituting a preferred embodiment of the invention; and FIG. 2 is a graph depicting the output voltage-output current characteristic of the regulating system of FIG. 1.

Referring now to FIG. 1 of the drawing, there is shown a voltage regulating system constructed in accordance with the teachings of the invention and suitable for providing a closely regulated source of D.C. voltage at its output. As seen in the drawing, the input terminals 10 and 11 of the regulator are adapted to be connected to an unregulated source of D.C. supply voltage, such as might be obtained, for example, from a vehicular battery wherein the D.C. voltage supplied by the battery varies with the state of charge of the battery. The output terminals 12 and 13 of the regulator are adapted to be connected to the load being supplied, and would be suitable for acting as the D.C. power supply for 2-way radio communications equipment, for example. Input terminal 10, which may be connected to the high or positive side of the unregulated D.C. supply source, is coupled by a lead 14 and a current-sensitive diode 15 to the emitter element 16 of a series power transistor 17. The transistor 17 should be capable of handling the range of load demand current encountered in a particular application and may comprise a type 2N257 PNP junction transistor, for example. The collector element 18 of the transistor is connected by a lead 19 to the output terminal 12 of the regulator and the input terminal 11 of the regulator is connected by a lead 20 to the output terminal 13, so that the transistor 17 is effectively connected in series between the input and output of the regulator. The transistor 17 is connected in a common emitter circuit configuration and functions as a power amplifier to regulate the output voltage from the regulator. This is accomplished by varying the forward bias applied between the base element 21 and the collector element 18 of the transistor in accordance with the deviations of the regulator output voltage, so that the regulating system provides a source of closely regulated D.C. voltage at the output terminals 12 and 13.

As seen in FIG. 1 of the drawing, the circuit for controlling the power transistor 17 includes a potentiometer 22 serially connected with a pair of semiconductor diodes 24 and 25 across the output terminals of the regulator. A movable tap 23 on the potentiometer 22 is connected by a lead 26 to the base element 27 of a transistor 28. The emitter element 29 of the transistor 28 is connected by a lead 30 to the circuit junction of a diode 31 and a resistance 32 which are shunted across the regulator output terminals. The diode 31 may be a semiconductor diode of the "Zener" type, so that a substantially constant voltage drop appears across the diode over a wide range of diode current. Since the diode 31 and the resistance 32 are connected in series across the output voltage terminals of the regulator, they act as a voltage divider to supply a constant potential to the emitter element 29 of the transistor 28. The transistor 28 is connected in a common emitter circuit configuration and functions as a sensing amplifier to detect the deviations in regulator output voltage from a predetermined value, as set by the potentiometer 22. As illustrated, the transistor 28 is an NPN junction transistor and may comprise a type 2N335 transistor, for example. The collector element 33 of the transistor is connected by a lead 34 to the base element 35 of a transistor 36. Transistor 36 has a collector element 37 which is connected by a lead 38 to the collector element 18 of the series power transistor 17. The emitter element 39 of transistor 36 is connected by a lead 40 to the base element 21 of the series power transistor, so that the output from transistor 36 effectively controls the base-collector bias of the series power transistor. The transistor 36 may comprise a PNP junction transistor, such as type 2N328A, for example. As thus far described, it is apparent that transistors 28 and 36 function to detect the variations of the regulator output voltage from a set value and to control the forward bias on the series power transistor 17 in accordance therewith.

The voltage regulating system of the invention also makes provision for stabilizing the operation of the regulator with respect to temperature variations caused both by changes in the ambient temperature of the environment of the regulator and by internal temperature changes of the power transistor itself caused by changes in the magnitude of the load current passing through the transistor. To this end, the base element 21 of the transistor 17 is connected to the emitter element 16 of the transistor by a base bias circuit comprising thermistor 41, resistance 42, lead 43, and current-sensitive diode 15. The thermistor 41 functions as an ambient temperature responsive resistance and may comprise, for example, a type 25 TDI thermistor. As the ambient temperature varies, the resistance of the thermistor varies in a manner to change the base bias on the transistor 17 to prevent any change from occurring in the output of the transistor 17. Since changes in the output of transistor 17 may also be caused by changes in the internal operating temperature of the transistor resulting from large load current changes, the current-sensitive diode 15 functions to vary the bias voltage between the base and emitter elements of the transistor in accordance with the magnitude of the load current, so that the output of the transistor 17 is stabilized. A suitable semiconductor diode for this purpose would be type SM-72, for example. Accordingly, the regulator is stabilized with respect to variations in ambient temperature by the action of thermistor 41 and is stabilized with respect to temperature variations caused by widely varying load currents by the action of diode 15. The function of diode 15 is seen to be of great value when it is realized that in applications involving two-way communications equipment, the load demand current may change almost instantaneously from a reasonably small value to a very large value as the equipment is switched from a receiving mode to a transmitting mode.

The voltage regulating system also includes resistors 44 and 45 which are serially connected across the input terminals 10 and 11 of the regulator. The circuit junction of these resistors is coupled by a semiconductor diode 46 and a lead 47 to the high or positive side of the regulator output. By suitably proportioning the values of the resistors 44 and 45, the diode 46 may be maintained in a non-conducting state during normal operation of the regulator. Since the cathode side of the diode 46 is coupled to the output terminal of the regulator and the anode side is coupled to the circuit junction of resistors 44 and 45 which act as a voltage divider, the voltage on the cathode side is normally more positive than the voltage on the anode side, so that the diode 46 does not conduct. In the event of an overload, such as may exist, for example, when a direct short circuit is made between the output terminals 12 and 13, the resistor 44 and the now conducting diode 46 become the load circuit for the supply voltage source. Furthermore, when the short circuit is removed, the diode 46 remains in a conductive state until a voltage is established across the resistor 22 and the branch containing diode 31 and resistance 32, to automatically restart the regulator. Finally, a capacitor 48 is connected across the output terminals 12 and 13 of the regulator by a lead 49 to act as a filter and to damp any transients which may occur during sudden changes in load demand current.

In describing the operation of the voltage regulating system of the invention, it may be assumed initially that the unregulated D.C. supply voltage source has just been connected across the input terminals 10 and 11. When this occurs, the resistors 44 and 45 act as a voltage divider to apply a given potential to the anode side of the diode 46. Since the output voltage of the regulator appearing between terminals 12 and 13 is initially zero, the cathode side of the diode 46 is less positive than the anode side, so that the diode conducts. This causes a voltage to appear across the branch containing resistor 22 and the branch containing diode 31 and resistance 32, so that the transistor 28 is forwardly biased into conduction. The transistor 28 then forwardly biases transistor 36 into conduction which, in turn, biases the series power transistor 17 into conduction, so that the regulating system is set into operation. Since at normal operating output voltages of the regulator, the cathode side of diode 46 is more positive than the anode side, the diode 46 is rendered non-conducting. During normal operation of the regulating system, any variations in the output voltage from the regulator, such as may be caused by load circuit variations or input voltage variations, for example, cause a change in the voltage across potentiometer 22. This varies the potential of the base element 27 of transistor amplifier 28. Since the emitter element 29 of the transistor 28 is supplied by a constant potential from the branch containing Zener diode 31 and resistor 32, the change in output voltage of the regulator produces a corresponding change in the forward bias on transistor 28. This change is then amplified by transistor 36 to vary the collector-base bias of the series power transistor 17, to thereby change the voltage drop across the transistor 17 in a direction to compensate for the change in output voltage, so that the output from the voltage regulator is maintained at the predetermined value. The predetermined output voltage of the regulator may be established by moving the tap 23 on potentiometer 22 to the desired setting. As explained previously, the thermistor 41 and current-sensitive diode 15 permit the regulator to maintain a constant voltage output under conditions of variable ambient temperature and/or variable load current demand by automatically varying the base-emitter bias on the transistor 17.

In the event that the output of the regulator is short-circuited, such that the terminal 12 is effectively connected to the terminal 13, the output voltage tends to fall to zero, so that the transistor amplifier 28 loses its forward bias and is rendered non-conductive. This, in turn, renders transistors 36 and 17 non-conductive, to thereby open up the circuit and prevent damage to the load equipment. At the same time, the diode 46 is rendered conductive and serves with resistor 44 as a load across the input terminals 10 and 11, to prevent damage to the regulator itself and also to the supply voltage source. When the short-circuit is removed, the diode 46 is still in a conducting state, so that it provides a voltage across the regulator output terminals to again bias the transistor 28 into conduction. This action biases transistors 36 and 17 into conduction to automatically restart the regulator. The above-described self-starting feature of the voltage regulating system of the invention is desirable because it permits regulator operation to be maintained during conditions when high leakage or partial shorts still permit usable performance. If desired, of course, the self-starting feature may be eliminated and provision for manual starting included. While direct short circuits will block the system instantly, due to the non-conduction of transistor 17, temporary intermediate overloads will merely proportionally drop the output voltage. It may also be pointed out that the diodes 24 and 25 are employed serially with the resistor 22 as a safety precaution to prevent damage to the transistors 28, 36 and 17 should the voltage across resistor 22 rise to an excessively high value, as during starting, for example.

The output voltage-output current characteristic of the voltage regulating system of FIG. 1 is illustrated in FIG. 2 of the drawing, wherein it is assumed that the unregulated D.C. supply voltage source ranges from approximately 20 volts to 30 volts. For this type and range of operation, the following table sets forth suitable values for the circuit parameters of the system.

| | |
|---|---|
| Thermistor 41 | 500 ohms at 25° C. |
| | 180 ohms at 50° C. |
| Resistor 44 | 1000 ohms. |
| Resistor 45 | 680 ohms. |
| Resistor 42 | 10 ohms. |
| Resistor 32 | 1000 ohms. |
| Potentiometer 22 | 5000 ohms. |
| Capacitor 48 | 68 mf. |
| Diodes 24, 25, 46 | Type 1N645. |

With the stated range of input voltage variation and with the values of circuit parameters set forth above, the output voltage from the regulator is maintained within about 5% of the set value, for example, 16 volts, as illustrated. It may be seen in FIG. 2 that the output voltage build up of the regulator is quite steep and is essentially free of overshoot. It may also be noted that the output current demand satisfied by the regulator at a constant output voltage may range from about 100 milliamps to about 500 milliamps. Additionally, the characteristic curve of FIG. 2 shows that the overload protection afforded by the regulating system of the invention is progressive. It may also be pointed out that there is a wide latitude in the choice of circuit parameters for fixing both current and voltage ranges to accommodate particular applications. For example, the values of the circuit parameters listed above allow a relatively high current in the branch containing resistors 44 and 45 during operation, when the diode 46 is biased out of conduction. Essentially, the choice of values here is a compromise and some little stability at start may be sacrificed if resistor 44 is made too large with respect to the operating resistance of the diode 46.

It is believed apparent that many changes could be made in the above-described voltage regulating system and many seemingly different embodiments of the invention constructed without departing from the scope thereof. For example, different circuit configurations could be employed for the power series transistor and the amplifier transistors and other circuit elements substituted for the diode and thermistor elements. Accordingly, it is intended that all matter contained in the above description or shown in the accompanying drawing shall be interpreted as illustrative and not in a limiting sense.

What is claimed is:

In a voltage regulating system, the combination of:

first and second input terminals;

first and second output terminals;

a first transistor including an emitter and a base and a collector and having its emitter connected to the first input terminal and its collector connected to the first output terminal;

a first voltage divider comprising a first intermediate terminal and resistance connected across said input terminals;

a second voltage divider connected across said output terminals and comprising a first non-linear Zener diode and a first resistor and a second intermediate terminal, said diode having its anode connected to said second intermediate terminal and its cathode connected to said first output terminal;

a second transistor including an emitter and a base and a collector and having its emitter connected to said second intermediate terminal;

a third voltage divider comprising a second resistor and at least one second non-linear diode, said second resistor being connected to the first output terminal and said second diode having an anode and a cathode which is connected to the second output terminal;

a connection between said second resistor and the base of said second transistor;

a third transistor having a base connected to the collector of said second transistor, and an emitter and a collector connected, respectively, to the base and collector of said first transistor;

and a semiconductor diode having an anode connected to said first intermediate terminal and a cathode connected to the first output terminal, the last-mentioned diode being conductive on overload to provide a current flow across the third voltage divider to bias the second transistor into conduction on removal of the overload.

References Cited in the file of this patent
UNITED STATES PATENTS

| | | |
|---|---|---|
| 2,751,550 | Chase | June 19, 1956 |
| 2,829,334 | Murnighan | Apr. 1, 1958 |
| 2,897,432 | Jackson | July 28, 1959 |
| 2,922,945 | Norris et al. | Jan. 26, 1960 |
| 2,927,262 | Paule | Mar. 1, 1960 |

OTHER REFERENCES

"Transistor-Overvoltage Protection," Electronic Design, Feb. 19, 1958, by J. J. Robinson.